(12) United States Patent
Clark et al.

(10) Patent No.: US 12,108,507 B2
(45) Date of Patent: Oct. 1, 2024

(54) INRUSH CURRENT PROTECTION CIRCUIT FOR SOLID STATE LIGHTING FIXTURES

(71) Applicant: Hubbell Incorporated, Shelton, CT (US)

(72) Inventors: Adam J. Clark, Bradenton, FL (US); Perry Romano, Bradenton, FL (US)

(73) Assignee: Hubbell Incorporated, Shelton, CT (US)

( * ) Notice: Subject to any disclaimer, the term of this patent is extended or adjusted under 35 U.S.C. 154(b) by 244 days.

(21) Appl. No.: 17/633,049

(22) PCT Filed: Aug. 6, 2020

(86) PCT No.: PCT/US2020/045202
§ 371 (c)(1),
(2) Date: Feb. 4, 2022

(87) PCT Pub. No.: WO2021/026351
PCT Pub. Date: Feb. 11, 2021

(65) Prior Publication Data
US 2022/0272813 A1  Aug. 25, 2022

Related U.S. Application Data

(60) Provisional application No. 62/883,783, filed on Aug. 7, 2019.

(51) Int. Cl.
*H05B 45/50* (2022.01)
*H02H 9/00* (2006.01)
(Continued)

(52) U.S. Cl.
CPC ............. *H05B 45/50* (2020.01); *H02H 9/001* (2013.01); *H02H 9/02* (2013.01); *H02J 7/0024* (2013.01);
(Continued)

(58) Field of Classification Search
CPC ........ H05B 45/30; H05B 45/40; H05B 45/50; H05B 45/52; H05B 47/20; H05B 47/21;
(Continued)

(56) References Cited

U.S. PATENT DOCUMENTS 8,339,055 B2 * 12/2012 Zhan .................... H05B 45/385
315/276
2010/0212148 A1   8/2010 Watanabe et al.
(Continued)

OTHER PUBLICATIONS

PCT/US2020/045202 International Search Report and Written Opinion dated Oct. 22, 2020 (17 pages).

*Primary Examiner* — Long Nguyen
(74) *Attorney, Agent, or Firm* — Michael Best & Friedrich LLP

(57) ABSTRACT

An inrush current protection circuit for a solid state lighting fixture is provided. The inrush current protection circuit includes one or more current limiting devices and one or more switching devices coupled in parallel with the one or more current limiting devices. The one or more switching devices are configured in a first state when the solid state lighting fixture draws an inrush current from a power source. The inrush current is provided to the one or more current limiting devices when the one or more switching devices are in the first state. The one or more switching devices are configured in a second state when the solid state lighting fixture draws a steady-state current from the power source. The steady-state current bypasses the one or more current limiting devices when the one or more switching devices are in the second state.

23 Claims, 5 Drawing Sheets

(51) Int. Cl.
  *H02H 9/02* (2006.01)
  *H02J 7/00* (2006.01)
  *H05B 45/30* (2020.01)
  *H02H 1/04* (2006.01)
  *H02H 3/08* (2006.01)

(52) U.S. Cl.
  CPC ............... *H05B 45/30* (2020.01); *H02H 1/04* (2013.01); *H02H 3/08* (2013.01)

(58) Field of Classification Search
  CPC .......... H05B 47/24; H05B 47/25; H02H 1/04; H02H 1/043; H02H 3/08; H02H 9/001; H02H 9/02
  See application file for complete search history.

(56) References Cited

U.S. PATENT DOCUMENTS

| | | | |
|---|---|---|---|
| 2010/0253245 A1 | 10/2010 | Du et al. | |
| 2011/0025217 A1* | 2/2011 | Zhan | H05B 45/50 315/219 |
| 2014/0084801 A1 | 3/2014 | Lys | |

\* cited by examiner

INRUSH CURRENT PROTECTION CIRCUIT FOR SOLID STATE LIGHTING FIXTURES

CROSS REFERENCE TO RELATED APPLICATIONS

This application claims the benefit to U.S. Provisional Application No. 62/883,783, filed on Aug. 7, 2019, the disclosures of which is incorporated herein by reference for all purposes.

FIELD

The present disclosure relates generally to solid state lighting fixtures and, more particularly, to an inrush current protection circuit for solid state lighting fixtures.

BACKGROUND

Solid state lighting fixtures can include one or more LED devices or other solid state devices that become illuminated as a result of the movement of electrons through a semiconductor material. LED devices are becoming increasingly used in many lighting applications and have been integrated into a variety of products, such as light fixtures. LED lighting fixtures can provide increased efficiency, life and durability, can produce less heat, and can provide other advantages relative to traditional incandescent and fluorescent lighting fixtures. Moreover, the efficiency of LED lighting fixtures has increased such that better performance can be provided at lower cost to the consumer.

LED lighting fixtures can include one or more LED driver circuits that are used to convert input power from a power source to a suitable drive current for powering the one or more LED devices. When LED lighting fixtures are activated (e.g., switched on), an inrush current is provided to the one or more LED driver circuits. In some instances, the inrush current can cause circuit breakers to trip or damage contacts of a switching device.

SUMMARY

Aspects and advantages of embodiments of the present disclosure be set forth in part in the following description, or may be learned from the description, or may be learned through practice of the embodiments.

In one aspect, an inrush current protection circuit for a solid state lighting fixture selectively coupled to a power source can include one or more current limiting devices and one or more switching devices coupled in parallel with the one or more current limiting devices. The one or more switching devices are configured in a first state when the solid state lighting fixture draws an inrush current from a power source. The inrush current is provided to the current limiting device when the switching device is in the first state. The switching device is configured in a second state when the solid state lighting fixture draws a steady-state current from the power source. The steady-state current bypasses the current limiting device when the switching device is in the second state.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
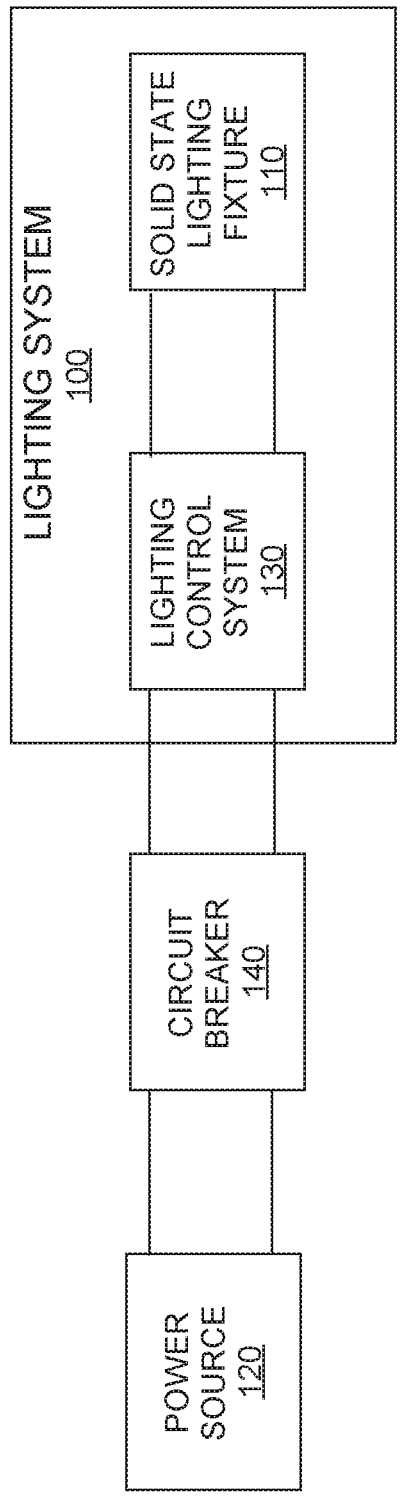
FIG. 1 depicts a block diagram of components of a lighting system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to solid state lighting fixtures having an inrush current protection circuit. In some implementations, the inrush current protection circuit can be coupled between a power source (e.g., AC power source, DC power source) and a driver circuit configured to provide a driver current to one or more solid state light sources (e.g., LEDs) of a solid state lighting fixture. In this manner, an inrush current the solid state lighting fixture draws from the power source each time the solid state lighting fixture is switched on to illuminate a room or space can be provided to the inrush current protection circuit. More specifically, the inrush current can be provided to one or more current limiting devices of the inrush current protection circuit. In some implementations, the one or more current limiting devices can be a thermistor. For instance, the thermistor can be negative temperature coefficient (NTC) thermistor. It should be appreciated, however, that the one or more current limiting devices can include any suitable type of device configured to reduce a magnitude of the inrush current.

In some implementations, the inrush current protection circuit can include one or more switching device, such as a transistor (e.g., MOSFET), a relay, or other suitable switching device coupled in parallel with the one or more current limiting devices. The one or more switching devices can be configured in a first state when the solid state lighting fixture draws the inrush current from the power source. When the one or more switching devices are configured in the first state, the inrush current can be provided to the one or more current limiting devices. In this manner, the one or more current limiting device can limit the inrush current the solid state lighting fixture draws from the power source each time the solid state lighting fixture is switched on to illuminate the room or space. The one or more switching devices can be configured in a second state when the solid state lighting fixture draws a steady state current from the power source. When the one or more switching devices are configured in the second state, the steady state current can bypass the one or more current limiting devices. In this manner, energy losses associated with the inrush current protection circuit can be reduced, because the steady state current is not provided to the driver circuit via the one or more current limiting devices.

In some implementations, the inrush current protection circuit can include one or more surge protection devices such as one or more fuses, breakers, metal oxide varistors, gas discharge tubes, Zener diodes, transient voltage suppression diodes, thyristors, electrostatic discharge protection devices, or any other suitable type of surge protection device. The surge protection elements can be configured to absorb short duration power surges and/or can be configured to disconnect power from the driver circuit during short duration power surges.

The inrush current protection circuit according to example aspects of the present disclosure provides numerous technical effects and benefits. For instance, the current limiting device of the inrush current protection circuit reduces or eliminates the occurrence of a circuit breaker tripping. Furthermore, the switching device of the inrush current protection circuit improves the energy efficiency of the solid state lighting fixture, because the switching device allows the steady-state current the solid state lighting fixture draws from the power source to bypass the current limiting device. In addition, the inrush current protection circuit can be combined with a surge protection circuit that is included in solid state lighting fixtures.

As used herein, a "lighting system" can include, but is not limited to, one or more of a lighting circuit, light engine, one or more lighting fixtures (i.e., luminaires), a plurality of lighting devices arranged in a space, a combination of any of the foregoing, or other system used to provide illumination. A "lighting fixture" or "luminaire" refers to a device used to provide light or illumination using one or more light sources. Furthermore, the term "about" used in conjunction with a numerical value is intended to refer to within 25% of the numerical value.

Figure 2:
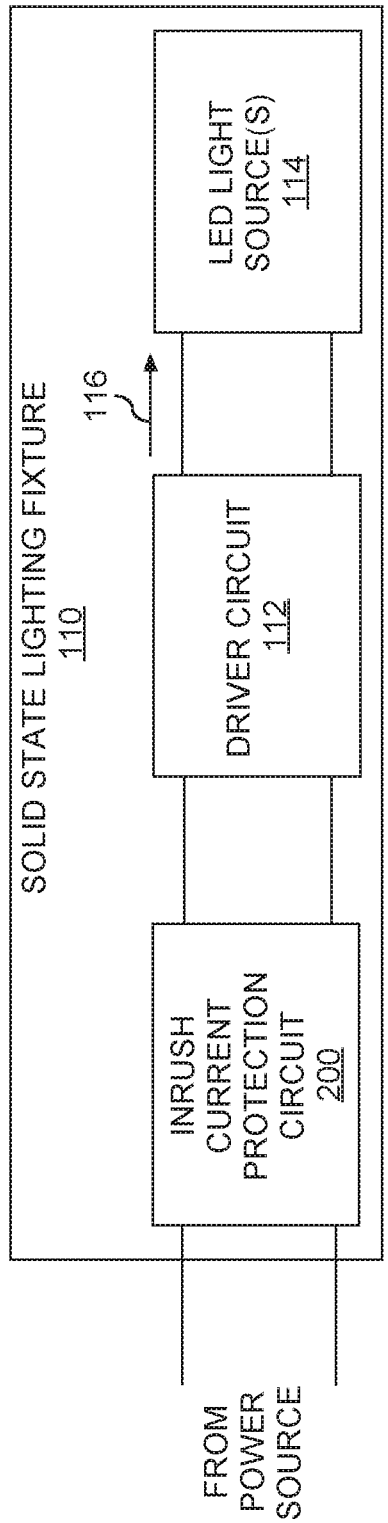
FIG. 2 depicts a block diagram of components of a solid state lighting fixture according to example embodiments of the present disclosure.

Referring now to FIGS. 1 and 2, a lighting system 100 is provided according to example embodiments of the present disclosure. The lighting system 100 can include a solid state lighting fixture 110 (e.g., luminaires). Although the lighting system 100 is depicted as having only one solid state lighting fixture 110, it should be appreciated that the lighting system can include any suitable number of solid state lighting fixtures 110.

As shown, the solid state lighting fixture 110 can include a driver circuit 112 and one or more LED light sources 114. The driver circuit 112 can be configured to receive input power from a power source 120 and convert the input power to a driver output or drive current 116 (e.g., driver current) suitable for powering the one or more LED light sources 114. The driver circuit 112 can include various components, such as switching elements (e.g., transistors). Gate timing commands can be provided to the one or more switching elements to convert the input power to the driver output 116.

It should be appreciated that the power source 120 can be any suitable power source, such as a single phase AC power source, multiphase AC power source (e.g., three-phase power source), DC power source, or other suitable power source. For instance, in some implementations, the power source 120 can be a single phase AC power source having a first AC line associated with a first AC potential (positive or negative AC voltage) and a second AC line associated with a second AC potential (e.g., a neutral).

In some implementations, the driver circuit 112 can be configured to adjust the driver output 116 based, at least in part, on a dimming control signal (e.g., 0V to 10 V dimming control signal). More specifically, the dimming control signal can be indicative of a voltage (e.g., 0 Volts to 10 Volts) at a control input of the driver circuit 112. For example, reducing the dimming control signal by 50% can result in a corresponding reduction in the driver output 116. The reduction of the driver output 116 can reduce the overall driver current for supply to the one or more LED light sources 114. In this manner, the lumen output of the one or more LED light sources 114 can be adjusted (e.g., dimmed) by varying the dimming control signal.

As shown, the lighting system 100 can include a lighting control system 130 configured to control power delivery to the one or more solid state lighting fixtures 110. In some implementations, the lighting control system 130 can include a wall switch configured to selectively couple the one or more solid state lighting fixtures 110 to the power source 120. In this manner, the one or more solid state lighting fixtures 110 can be activated (e.g., switched on) or deactivated (e.g., switched off) via user-manipulation of the wall switch. In some implementations, the wall switch can be a dimmer switch. In this manner, the lumen output of the one or more LED light sources 114 can be adjusted (e.g., dimmed or brightened).

It should be appreciated that the solid state lighting fixture 110 draws an inrush current from the power source 120 each time the solid state lighting fixture 110 is activated (e.g., switched on) via the lighting control system 130. In some instances, the inrush current can trip a circuit breaker 140 coupled between the power source 120 and the solid state lighting fixture 110. As will be discussed below in more detail, the solid state lighting fixture 110 can include an inrush current protection circuit 200 configured to limit the inrush current the solid state lighting fixture 110 draws each time the solid state lighting fixture 110 is activated (e.g., switched on) via the lighting control system 130.

Figure 3:
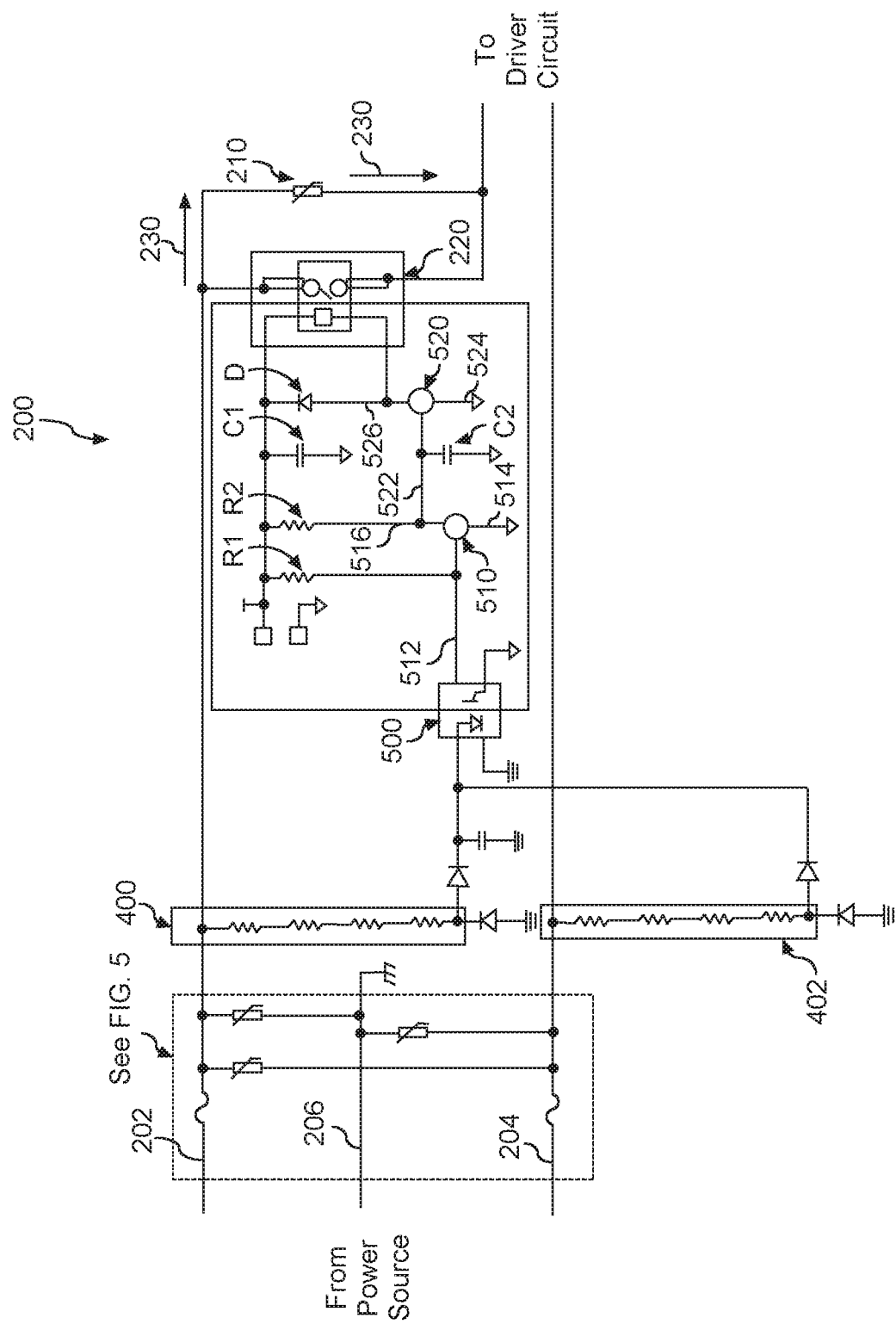
FIG. 3 depicts a circuit diagram of an inrush current protection circuit of a solid state lighting fixture according to example embodiments of the present disclosure.
Figure 4:
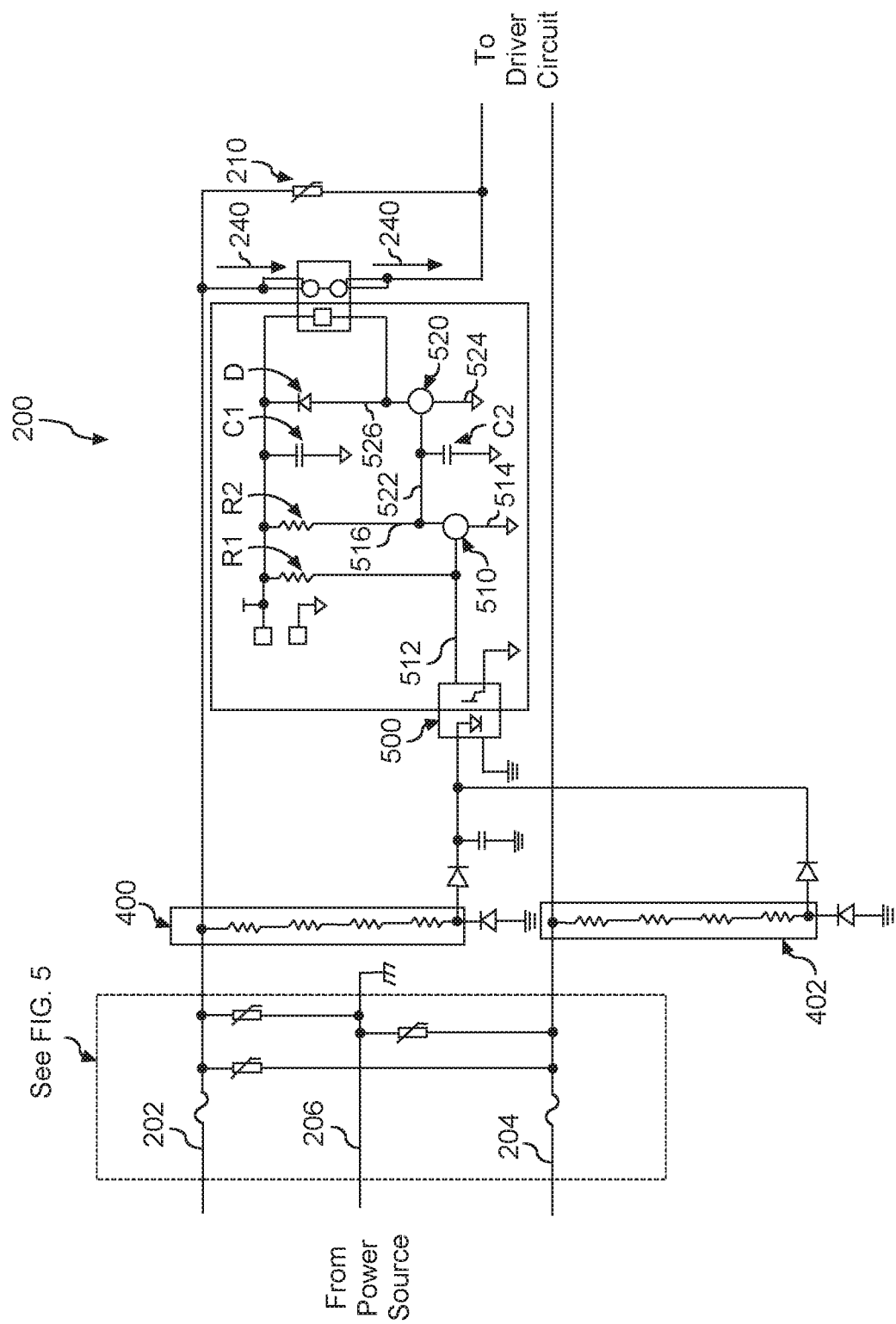
FIG. 4 depicts a circuit diagram of an inrush current protection circuit of a solid state lighting fixture according to example embodiments of the present disclosure.
Figure 5:
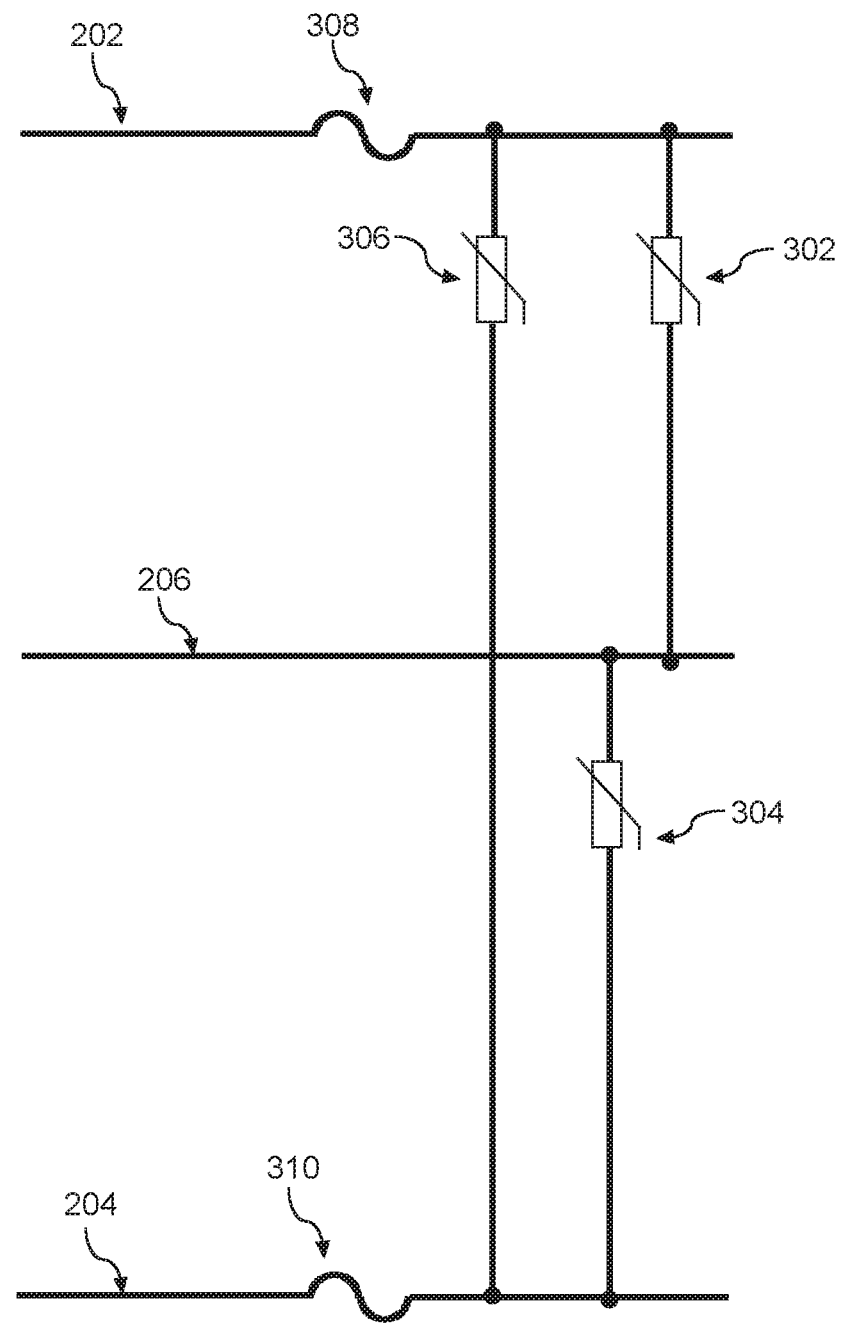
FIG. 5 depicts a circuit diagram of surge protection devices of the inrush current protection circuit of FIGS. 3 and 4 according to example embodiments of the present disclosure.

Referring now to FIGS. 3 and 4, a circuit diagram of the inrush current protection circuit 200 is provided according to example embodiments of the present disclosure. As shown, the inrush current protection circuit 200 can include a first conductor 202 and a second conductor 204. The first conductor 202 and the second conductor 204 can be coupled between the power source 120 (FIG. 1) and the driver circuit 112 (FIG. 2) of the solid state lighting fixture 110 (FIG. 2). In this manner, the inrush current protection circuit 200 can be coupled between the power source 120 and the driver circuit 112. It should be appreciated that, in some implementations, the first conductor 202 and the second conductor 204 can be coupled to the power source 120 via the lighting control system 130, the circuit breaker 150 (FIG. 1), or both.

The first conductor 202 can be associated with a first potential (e.g., +120 V, −120 V, etc.) and the second conductor 204 can be associated with a second potential (e.g., 120 V, −120V, 0V, etc.). In some implementations, the first conductor 202 can be associated with a positive or negative potential and the second conductor 204 can be associated with a neutral. As shown, the inrush current protection circuit 200 can also include a third conductor 206 associated with a reference (e.g., a ground reference).

In some implementations, the inrush current protection circuit 200 can include one or more current limiting devices 210 coupled to the first conductor 202. The current limiting device(s) 210 can be configured to limit the inrush current the solid state lighting fixture 110 draws from the power source 120 each time the solid state lighting fixture 110 is activated (e.g., switched on) via the lighting control system 130 (FIG. 1). In some implementations, the current limiting device(s) 210 can include one or more fixed resistors. In alternative implementations, the current limiting device(s) 210 can include a thermistor. More specifically, the current limiting device(s) 210 can be a negative temperature coefficient (NTC) thermistor. It should be appreciated; however, that current limiting device(s) 210 can include any suitable type of device configured to limit the inrush current.

As shown, the inrush current protection circuit 200 can include one or more switching devices 220. In some implementations, the switching device(s) 220 can be coupled to the first conductor 202 such that the switching device(s) 220 and the current limiting device(s) 210 are arranged in a parallel configuration. The switching device(s) 220 can be configurable in at least a first state (FIG. 3) and a second state (FIG. 4). When the solid state lighting fixture 110 is activated (e.g. switched on) via the lighting control system 130, the switching device(s) 220 can be configured in the first state. In this manner, an inrush current 230 the solid state lighting fixture 110 draws from the power source 120 can be provided to the current limiting device(s) 210.

As discussed above, in some implementations, the current limiting device(s) 210 can be a thermistor. In such implementations, a temperature of the thermistor can increase while the current limiting device 210 limits the inrush current 230. As the temperature of the thermistor increases, a resistance of the thermistor decreases relative to a resistance of the thermistor prior to limiting the inrush current 230. In this manner, the thermistor can limit the inrush current 230 the solid state lighting fixture 110 draws from the power source 120 when the solid state lighting fixture 110 is activated (e.g., switched on). It should be understood that the solid state lighting fixture 110 can draw a steady state current 240 from the power source 120 after the solid state lighting fixture 110 has been activated (e.g., switched on) for a predetermined amount of time.

In some implementations, the steady state current 240 can be provided to the driver circuit 112 via the current limiting device 210. When the steady state current 240 the solid state lighting fixture 110 draws from the power source 120 is initially provided to the driver circuit 112 via the current limiting device 210, the driver circuit 112 can be configured to provide auxiliary power to the switching device 220. In some implementations, the auxiliary power the switching device 220 receives from the driver circuit 112 can configure the switching device 220 in the second state. More specifically, the auxiliary power can cause the switching device 220 to transition from the first state to the second state. It should be appreciated, however, that the switching device 220 can draw power from any suitable auxiliary power source. For instance, in some implementations, the switching device 220 can draw power from a dedicated off-line AC power supply.

When the switching device 220 is in the second state, the steady state current 240 the solid state lighting fixture 110 draws from the power source 120 is no longer provided to the driver circuit 112 via the current limiting device 210.

Instead, as shown in FIG. 4, the steady state current 240 bypasses the current limiting device 210. In this manner, the energy efficiency of the solid state lighting fixture 110 can be improved, because the current limiting device 210 is no longer consuming the power being drawn from the power source 120. Furthermore, the current limiting device 210 can cool off such that a temperature of the current limiting device 210 returns to about the temperature of the current limiting device 210 prior to limiting the inrush current 230. In this manner, the current limiting device 210 can cool off as needed to allow the current limiting device to be capable of limiting the inrush current 230 the next time the solid state lighting fixture is activated (e.g., switched or is the light control system 130. In some implementations, the switching device 220 can switch back to the first state when a power interruption (e.g., fault) occurs. As such, the current limiting device 210 can provide protection when the power resets and the solid state lighting fixtures 110 once again draws the inrush current 230 from the power source 120. In this manner, the current limiting device 210 can once again limit the inrush current 230.

In some implementations, the switching device 220 can, as shown in FIGS. 3 and 4, be a relay switch having a contactor and coil. The contactor can be movable between the first (FIG. 3) and the second state (FIG. 4). Furthermore, the coil can be energized via the auxiliary power the driver circuit 112 provides the switching device 220. When the coil is energized, the contactor can move from the first state to the second state to allow the steady-state current to bypass the current limiting device 210. It should be appreciated that other suitable switching devices (e.g., transistors) can be used in place of the relay switch depicted in FIGS. 3 and 4.

In some implementations, the relay switch can be configured to transition from the first state to the second state a predetermined amount of time after the solid state lighting fixture 110 is activated (e.g., switched on). For instance, in some implementations, the predetermined amount of time can range from about 200 milliseconds to about 500 milliseconds. In some implementations, the predetermined about of time can be about 250 milliseconds. When the relay switch is in the second state, it should be appreciated that the relay switch is configured to transition from the second state to the first state when the solid state lighting fixture 110 is deactivated (e.g., switched off) via the lighting control system 130 such that the solid state lighting fixture 110 is decoupled from the power source 120.

In some implementations, the inrush current protection circuit 200 can include one or more surge protection devices. As shown, the inrush current protection circuit 200 can include a first surge protection device 302, a second surge protection device 304, and a third surge protection device 306. It should be appreciated that the inrush current protection circuit 200 can include more or fewer surge protection devices.

As shown, the first surge protection device 302 can be coupled between the first conductor 202 and the third conductor 206. In this manner, the first surge protection device 302 can provide protection by clamping voltage during current surges between the first conductor 202 and the third conductor 206. The second surge protection device 304 can be coupled between the second conductor 204 and the third conductor 206. In this manner, the second surge protection device 304 can provide protection by clamping voltage during current surges between the second conductor 204 and the third conductor 206. The third surge protection device 306 can be coupled between the first conductor 202 and the second conductor 204. In this manner, the third surge protection device 306 can provide protection by clamping voltages during current surges between the first conductor 202 and the second conductor 204.

Although the first surge protection device 302, second surge protection device 304, and third surge protection device 306 depicted in FIGS. 3 and 4 are metal oxide varistors, those of ordinary skill in the art, using the disclosures provided herein, will understand that other surge protection devices can be used without deviating from the scope of the present disclosure, such as TVS diodes, thyristors, electrostatic discharge protection devices, or any other suitable type of surge protection device.

In some implementations, the inrush current protection circuit 200 can include one or more overcurrent protection devices. For instance, the inrush current protection circuit 200 can include a first overcurrent protection device 308 coupled in series with the first conductor 202. In some implementations, the first overcurrent protection device 308 can be a fuse. In this manner, the first overcurrent protection device 308 can be configured to open when a current higher than a fuse rating of the first overcurrent protection device 308 passes therethrough.

In some implementations, the inrush current protection circuit 200 can further include a second overcurrent protection device 310. As shown, the second overcurrent protection device 310 can be coupled in series with the second conductor 204. In some implementations, the second overcurrent protection device 310 can be a fuse. In this manner, the second overcurrent protection device 310 can be configured to open when a current higher than a fuse rating of the second overcurrent protection device 310 passes therethrough.

In some implementations, the inrush current protection circuit 200 can include a first group of resistors 400 coupled between the first conductor 202 and a return path. As shown, the first group of resistors 400 can, in some implementations, include four separate resistors. It should be appreciated, however, that the first group of resistors 400 can include more or fewer resistors.

Alternatively or additionally, the inrush current protection circuit 200 can include a second group of resistors 402 coupled between the second conductor 204 and the return path. As shown, the second group of resistors 402 can, in some implementations, include four separate resistors. It should be appreciated, however, that the second group of resistors can include more or fewer resistors.

In some implementations, the inrush current protection circuit 200 can include an optoisolator transistor 500. The optoisolator transistor 500 can be configured to isolate the switching device 220 from a line voltage (e.g., potential between first conductor 202 and second conductor 204) associated with the power source 120. As will be discussed below in more detail, the inrush current protection circuit 200 can include various circuit components configured to control parameters (e.g., current, voltage) associated with the auxiliary power the driver circuit 112 provides the switching device 220.

In some implementations, the inrush current protection circuit 200 can include a first switching element 510 (e.g., transistor) and a second switching element 520 (e.g. transistor). As shown, the first switching element 510 can include a first terminal 512, a second terminal 514, and a third terminal 516. The first terminal 512 can be coupled to the optoisolator transistor 500. The second terminal 514 can be coupled to ground. The third terminal can be coupled to the switching device 220.

As shown, the second switching element 520 can include a first terminal 522, a second terminal 524, and a third terminal 526. The first terminal 522 of the second switching element 520 can be coupled to the third terminal 516 of the first switching element 510. The second terminal 524 of the second switching element can be coupled to ground. The third terminal 526 of the second switching element 520 can be coupled to the switching device 220.

In some implementations, the inrush current protection circuit 200 can include a first resistor R1 and a second resistor R2. As shown, the first resistor R1 can be coupled between the switching device 220 and the first terminal 512 of the first switching element 510. Furthermore, the second resistor R2 can be coupled between the switching device 220 and the third terminal 516 of the second switching element 520.

In some implementations, the inrush current protection circuit 200 can include a first capacitor C1 and a second capacitor C2. As shown, the first capacitor C1 can be coupled between the switching device 220 and ground. The second capacitor C2 can be coupled between the second switching element 520 and ground. More specifically, the second capacitor C2 can be coupled between ground and the first terminal 522 of the second switching element 520. Alternatively or additionally, the inrush current protection circuit can include a diode D coupled between the switching device and the second switching element 520. For instance, the diode D can be coupled between the switching device 220 and the third terminal 526 of the second switching element 520.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An inrush current protection circuit for a solid state lighting fixture selectively coupled to a power source, the inrush current protection circuit comprising:
   one or more current limiting devices;
   one or more switching devices coupled in parallel with the one or more current limiting devices, the one or more switching devices configured in a first state when the solid state lighting fixture draws an inrush current from the power source, the one or more switching devices configured in a second state when the solid state lighting fixture draws a steady-state current from the power source,
   wherein when the one or more switching devices are configured in the first state, the inrush current is provided to the one or more current limiting devices,
   wherein when the one or more switching devices are configured in the second state, the steady-state current bypasses the one or more current limiting devices, and
   wherein a resistance of the one or more current limiting devices decreases from an initial resistance in response to the one or more switching devices being configured in the first state.

2. The inrush current protection circuit of claim 1, wherein when the one or more switching devices are configured in the second state, the one or more switching devices draw power from a driver circuit of the solid state lighting fixture.

3. The inrush current protection circuit of claim 1, wherein the one or more switching devices are configured to transition from the second state to the first state when the solid state lighting fixture is decoupled from the power source such that the solid state lighting fixture no longer draws the steady-state current from the power source.

4. The inrush current protection circuit of claim 1, wherein the one or more switching devices comprise a relay switch.

5. The inrush current protection circuit of claim 4, wherein the relay switch is configured to transition from the first state to the second state a predetermined amount of time after the solid state lighting fixture is coupled to the power source such that the solid state lighting fixture draws the inrush current.

6. The inrush current protection circuit of claim 5, wherein the predetermined amount of time is about 250 milliseconds.

7. The inrush current protection circuit of claim 1, wherein the one or more current limiting devices comprises a thermistor.

8. The inrush current protection circuit of claim 7, wherein the thermistor comprises a negative temperature coefficient thermistor.

9. The inrush current protection circuit of claim 1, further comprising:
one or more surge protection devices comprising, wherein the one or more surge protection devices comprise:
a first surge protection device coupled between a first conductor coupling the solid state lighting fixture to the power source and a second conductor coupling the solid state lighting fixture to the power source;
a second surge protection device coupled between the first conductor and a third conductor coupling the solid state lighting fixture to ground; and
a third surge protection device coupled between the second conductor and the third conductor.

10. The inrush current protection circuit of claim 9, wherein the first surge protection device, the second surge protection device, and the third surge protection device each comprise a metal oxide varistor.

11. The inrush current protection circuit of claim 9, further comprising:
one or more overcurrent protection devices.

12. The inrush current protection circuit of claim 11, further comprising:
a first overcurrent protection device coupled to the first conductor; and
a second overcurrent protection device coupled to the second conductor.

13. The inrush current protection circuit of claim 12, wherein the first overcurrent protection device and the second overcurrent protection device each comprise a fuse.

14. The inrush current protection circuit of claim 1, wherein the one or more switching devices is configured to transition from the first state to the second state a predetermined amount of time after the solid state lighting fixture is coupled to the power source such that the solid state lighting fixture draws the inrush current.

15. The inrush current protection circuit of claim 1, further comprising a surge protector coupled between the solid state lighting fixture and the power source and configured to protect the solid state lighting fixture against high voltage surges.

16. A solid state lighting fixture selectively coupled to a power source, the solid state lighting fixture comprising:
one or more LED light sources;
a driver circuit configured to provide a driver current to the one or more LED light sources; and
an inrush current protection circuit coupled between the power source and the driver circuit, the inrush current protection circuit comprising:
one or more current limiting devices; and
one or more switching devices coupled in parallel with the one or more current limiting devices, the one or more switching devices configured in a first state when the solid state lighting fixture draws an inrush current from the power source, the one or more switching devices configured in a second state when the solid state lighting fixture draws a steady-state current from the power source,
wherein when the one or more switching devices are configured in the first state, the inrush current is provided to the one or more current limiting devices,
wherein when the one or more switching devices are configured in the second state, the steady-state current bypasses the one or more current limiting devices, and
wherein a resistance of the one or more current limiting devices decreases from an initial resistance in response to the one or more switching devices being configured in the first state.

17. The solid state lighting fixture of claim 16, wherein when the one or more switching devices are configured in the second state, the one or more switching devices draw power from the driver circuit.

18. The solid state lighting fixture of claim 16, wherein the one or more switching devices are configured to transition from the second state to the first state when the solid state lighting fixture is decoupled from the power source such that the solid state lighting fixture no longer draws the steady-state current from the power source.

19. The solid state lighting fixture of claim 16, further comprising:
a relay switch, wherein the relay switch is configured to transition from the first state to the second state a predetermined amount of time after the solid state lighting fixture is coupled to the power source such that the solid state lighting fixture draws the inrush current.

20. The solid state lighting fixture of claim 19, wherein the predetermined amount of time is about 250 milliseconds.

21. The solid state lighting fixture of claim 16, wherein the one or more current limiting devices comprises a thermistor.

22. A lighting system comprising:
a power source;
at least one light source;
a lighting control system configured to selectively couple the at least one light source to the power source;
a driver circuit configured to provide a driver current to the at least one light source; and
an inrush current protection circuit coupled between the power source and the driver circuit, the inrush current protection circuit comprising:
one or more current limiting devices; and
one or more switching devices coupled in parallel with the current limiting device, the one or more switching devices configured in a first state when the solid state lighting fixture draws an inrush current from the power source, the one or more switching devices configured in a second state when the solid state lighting fixture draws a steady-state current from the power source, and wherein when the one or more switching devices are configured in the first state, the inrush current is provided to the one or more current limiting devices, wherein when the one or more switching devices are configured in the second state, the steady-state current bypasses the one or more current limiting devices, and wherein a resistance of the one or more current limiting devices from an initial resistance in response to the one or more switching devices being configured in the first state.

23. The lighting system of claim 22, wherein the one or more current limiting devices comprises a thermistor.

* * * * *